INVENTORS
HAROLD E. LEMONT, JR.
BY GERHARD J. SISSINGH

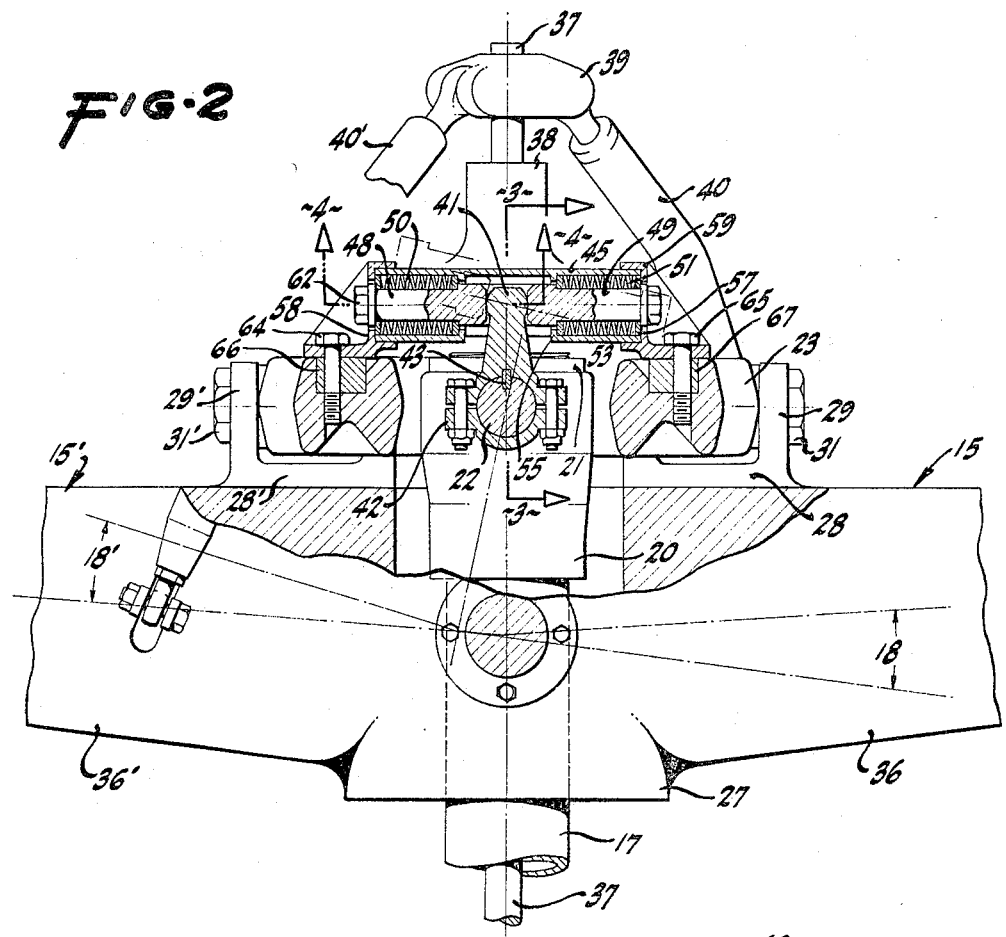
FIG-2
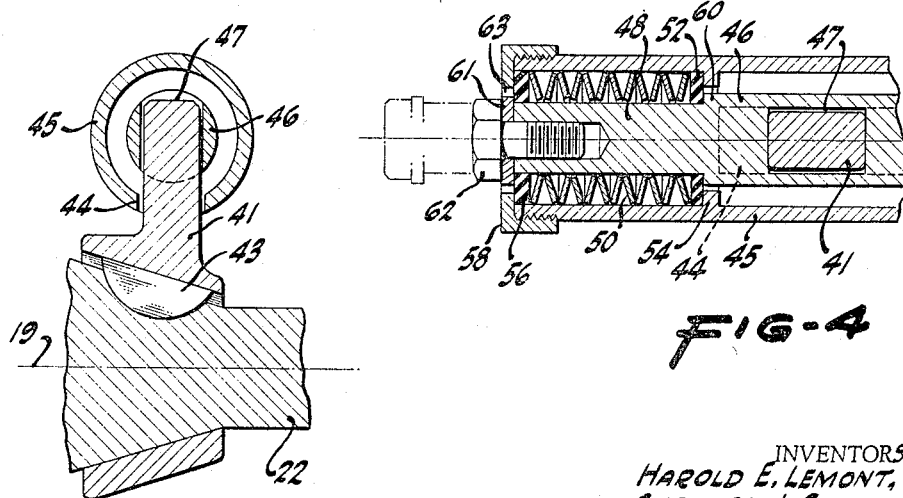
FIG-3
FIG-4
INVENTORS
HAROLD E. LEMONT, JR.
GERHARD J. SISSINGH
BY Stanley Bialos
ATTORNEY Nov. 29, 1966   H. E. LEMONT, JR., ETAL   3,288,226
TEETERING ROTOR HUB ASSEMBLY
Filed March 15, 1965   5 Sheets-Sheet 3

Stanley Bialos
ATTORNEY

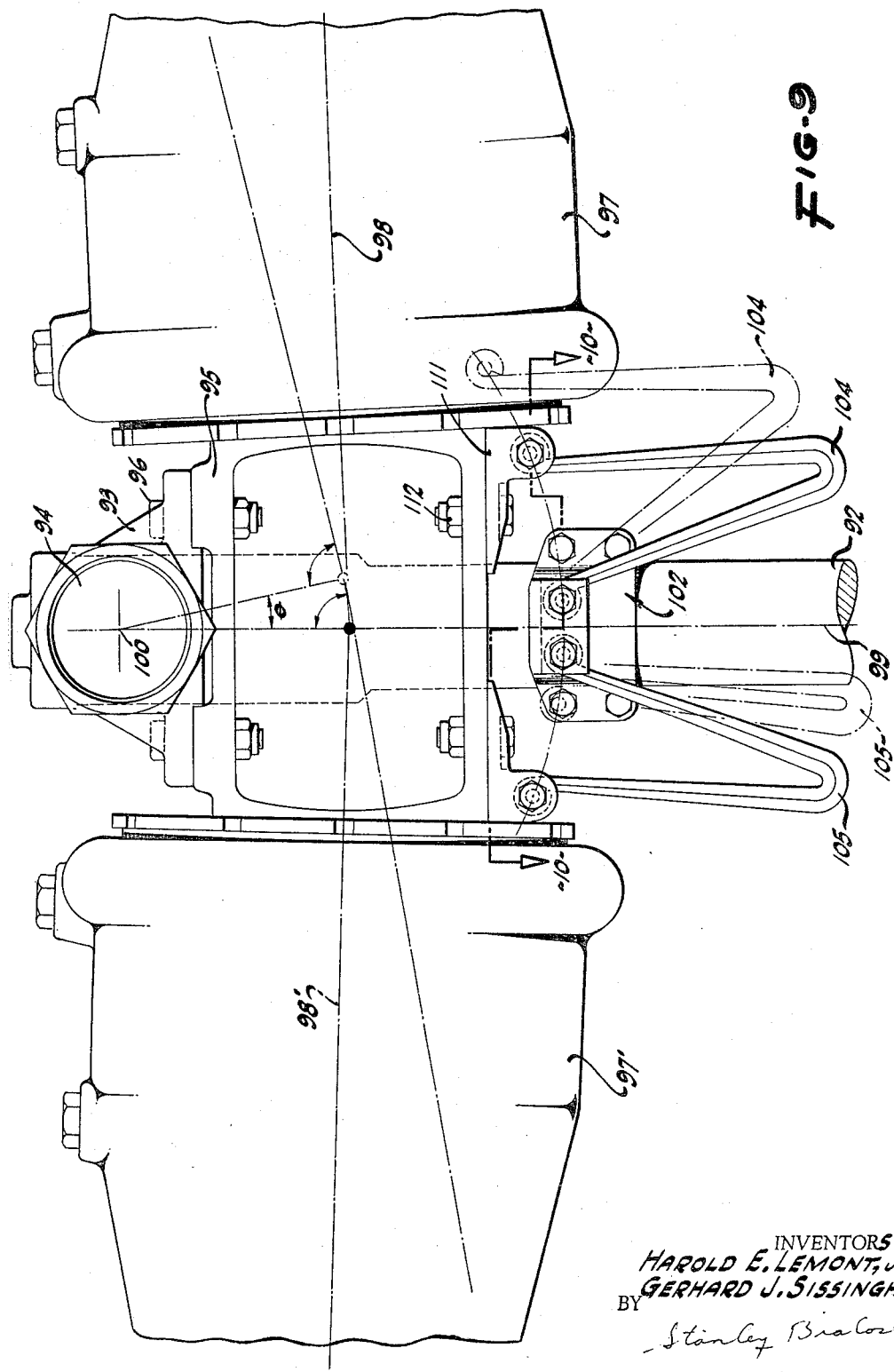

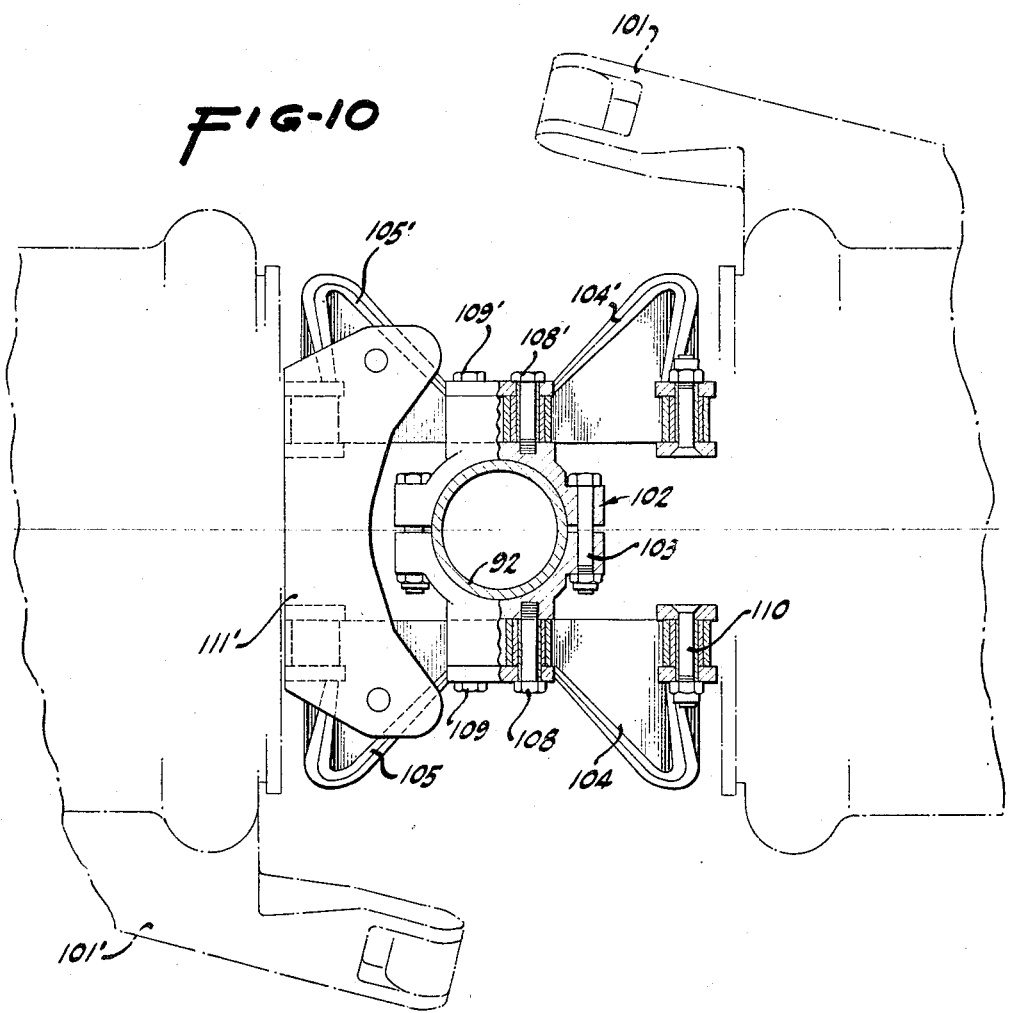
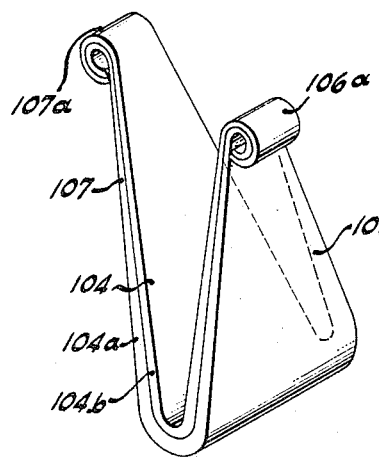

United States Patent Office 3,288,226
Patented Nov. 29, 1966

3,288,226
TEETERING ROTOR HUB ASSEMBLY
Harold E. Lemont, Jr., Menlo Park, and Gerhard J. Sissingh, San Mateo, Calif., assignors, by mesne assignments, to Fairchild Hiller Corporation, Hagerstown, Md., a corporation of Maryland
Filed Mar. 15, 1965, Ser. No. 439,597
6 Claims. (Cl. 170—160.26)

This invention relates to the class of vehicles known as rotary wing aircraft (which may be exemplified by the helicopter) and, more particularly, to a rotor hub assembly therefor.

In contemporary helicopters, the rotary wing assembly or lift wing assembly thereof is structurally comprised so that each rotor blade is supported for limited angular displacements about its longitudinal or span-wise axis to permit the collective pitch of such blades to be selectively adjusted for the purpose of controlling the rate of ascent and descent of the aircraft, and is further comprised so as to permit the tip path plane described by the rotor blades to be selectively tilted in some desired azimuth to control and direct horizontal movement of the craft. Such tilting of the tip path plane (or rotor plane) is referred to as cyclic control, and it may be obtained in various ways, such as, in a semi-rigid or teetering type rotor, by directly tilting the rotor hub assembly or by cyclically feathering each rotor blade in an appropriate pattern as the lift wing assembly is rotated to effect such tilting of the rotor hub.

In a helicopter having a teetering type rotor, the rotor hub assembly thereof is supported for pivotal movements relative to the upwardly extending rotor column or mast; and in some instances such movements are generally universal and may be provided by a ball and socket type mounting or a gimbal ring mounting, and in other instances such movements occur about a single axis that may be generally normal to the rotor column (although sometimes slightly offset therefrom) and which, most often, is denoted the "teetering" axis. With a hub assembly of either general type, the introduction of cyclic control effectively tilts the tip path plane of the rotor blades by causing the hub assembly to pivot relative to the rotor column.

Tilting of the rotor tip path plane by the introduction of cyclic control offsets the rotor thrust from the desired position of alignment thereof with the flight center of gravity of the aircraft, and this offset produces a rolling or pitching torque on the aircraft body. Such rolling or pitching torque creates a condition of aircraft unbalance; and in order to limit the same to controllable magnitudes, the maximum amount of permissible rotor plane tilt is generally restricted by stop structures and is selected on the basis of control and trim requirements of the aircraft as well as on the requirement for reserve control for unusual flight conditions.

By way of example, in aircraft having a teetering rotor hub assembly, approximately 3° of tilt on each side of the neutral rotor hub position may be allowed for normal control to produce angular acceleration of the craft, another 3° on each side of the neutral position may be allocated for unusual control requirements, and a further 3° on each side of neutral may be provided to correct for changes in the location of the flight center of gravity of the aircraft. In this latter respect, it may be noted that the flight center of gravity of a helicopter is continually changing; and because the control characteristics of the aircraft are critically related to the location of such center of gravity it is customary to equip each craft with movable ballast to compensate for relatively large changes in loading conditions which could not otherwise be accommodated without loss of essential control.

Further, each helicopter is designed to accommodate movement of the flight center of gravity thereof through a predetermined range without sacrificing the aforementioned control requirements, and in general it may be stated that such range of movement must be quite restricted. Such restriction is very severe in single-rotor aircraft having a teetering rotor hub assembly, and, for example, the extremes of the longitudinal range of center of gravity travel are often selected to lie approximately 0° to 4° ahead of the center line of the main rotor mast and the extremes of the lateral range of center of gravity travel are often limited to no more than 3° on each side of the center line of the main rotor mast. When travel of the flight center of gravity of the aircraft is limited to within the design ranges therefor, cyclic control of an appropriate order can be introduced into the rotor blade assembly to adjustably tailor the same with respect to any contemporary location of the center of gravity so that the rotor thrust is aligned therewith and effectively passes therethrough. Thus, aircraft unbalance can be obviated for any position of its center of gravity within the limited permissible range of movement thereof.

In view of the foregoing, an object of the present invention is to provide an improved means for generally increasing the rotor control available in aircraft having a teetering rotor hub assembly.

Another object of the invention is that of providing an improved arrangement for extending the permissible range of longitudinal or fore and aft travel of the flight center of gravity of a helicopter, with the result that the control available from tilt of the rotor thrust is increased.

Still another object is in the provision of an improved control arrangement of the character described, and in which the displacement of the cyclic control stick required for maneuvering is reduced.

A further object is to provide an arrangement of the type described which is also effective to center the lift wing or rotor blade assembly in the non-rotative condition thereof so that such assembly remains generally normal to the rotor column whereby the ground handling characteristics of the aircraft are improved.

Still a further object is that of providing in a helicopter having a teetering rotor hub assembly pivotal about a teetering axis in response to the introduction of cyclic control, structure for automatically developing a moment about the teetering axis of such rotor hub assembly tending both to resist tilting of the rotor tip path plane and to restore the rotor column to an approximate condition of normalcy with respect to such plane following any change in the disposition thereof at least in the fore and aft directions.

Additional objects and advantages of the invention will become apparent as the specification develops.

Embodiments of the invention are illustrated in the accompanying drawings, in which FIGURE 1 is essentially a broken top plan view of a rotor hub assembly embodying the invention, certain of the collective pitch control elements being omitted for clarity and portions of the structure being broken away to illustrate structural details;

FIGURE 2 is a broken longitudinal sectional view taken generally along the line 2—2 of FIGURE 1;

FIGURE 3 is an enlarged, broken vertical sectional view taken along the line 3—3 of FIGURE 2;

FIGURE 4 is an enlarged, broken longitudinal sectional view taken along the line 4—4 of FIGURE 2;

FIGURE 9 is a broken side view in elevation of a further modified rotor hub assembly embodying the invention;

FIGURE 10 is a broken longitudinal sectional view taken along the line 10—10 of FIGURE 9, the blade hub being shown in broken lines to indicate the relative positions thereof with respect to the detailed structure; and FIGURE 11 is a perspective view of one of the resilient biasing elements employed in the embodiment shown in FIGURES 9 and 10.

Figure 1:
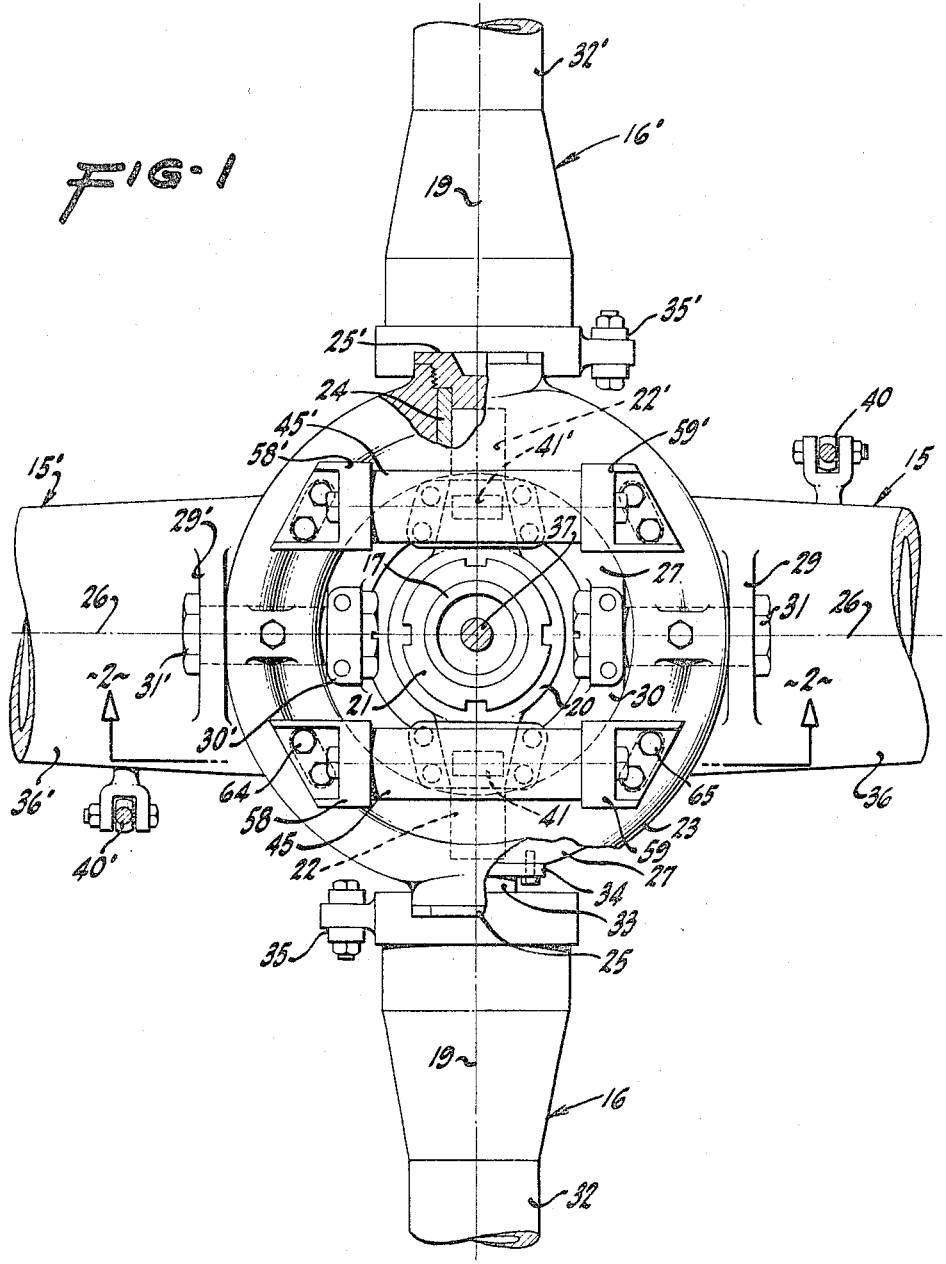

The lift wing assembly or rotor blade assembly illustrated generally in FIGURES 1 and 2 defines a teetering rotor hub of the type in which cyclic control is introduced by directly tilting the rotor hub assembly rather than by cyclically feathering the main rotor blades to change the tip path plane thereof; and except for those changes made to exemplify the present invention, the rotor blade assembly both structurally and functionally may be the same as the assembly disclosed and described in detail in Patent No. 2,534,353.

Accordingly, the rotor blade assembly is provided with diametrically opposite lift wing structures or main rotor blades partially illustrated in FIGURE 1 and generally indicated with the numerals 15 and 15', and it is also provided with a pair of control blade structures partially shown in FIGURE 1 and generally indicated with the numerals 16 and 16'. The main rotor blade structures 15 and the control blade structures 16 are supported for concurrent universal pivotal movement, as will be described in detail, adjacent and with respect to the upper end of a rotor column or shaft 17 which is rotatably driven through an engine, gear reducer and clutch mechanism (none of which are shown). Each of the control blades 16 is provided with a low aspect ratio and a short radius so that the control rotor response speed is fixed at a relatively low value compared with the main rotor blades 15, each of which has a high aspect ratio and a considerably greater radius. The main rotor blades and control blades are supported for rotation about the axis of the column or drive shaft 17, and the main rotor blades 15 are also supported for collective pitch adjustments about the span-wise axes thereof respectively denoted in FIGURE 2 with the numerals 18 and 18'. For the purpose of providing cyclic control, the rotor assembly is supported for flapping or end-to-end tilting about a teetering axis 19 (FIGURE 1) transversely oriented with respect to the span-wise axes of the blades 15.

Considering the support arrangement for the blades 15 and 16 in greater detail, the rotatably driven shaft or rotor column 17 (which is hollow) is equipped at its upper end with a coaxially mounted sleeve 20 keyed or otherwise secured to the shaft so as to rotate therewith. The sleeve 20 is constrained against axial displacements along the shaft 17 in that at its lower end it seats upon a suitable stop or shoulder provided by the shaft, and is held thereagainst by a nut 21 that seats upon the upper end of the sleeve and threadedly engages the shaft. The sleeve 20 has a pair of outwardly extending, diametrically opposite trunnions 22 and 22' formed integrally therewith, and such trunnions define the teetering axis 19.

Pivotally mounted upon the trunnions 22 and 22' is a gimbal ring 23; and as indicated in FIGURE 1, anti-friction bearings 24 may be interposed between the trunnions and circumjacent surfaces of the gimbal ring to minimize frictional resistance to angular displacements of the gimbal ring. Although the bearing structure 24 is illustrated in FIGURE 1 in the form of a sleeve, for purposes of simplicity, roller bearing structures will generally be employed. The location of the gimbal ring 23 along the trunnions and teetering axis 19 defined thereby is fixedly determined by nuts 25 and 25' threadedly received within openings provided therefor by offset bosses formed along the gimbal ring 23. These nuts are in substantial abutment with the respective ends of the trunnions, and thereby prevent significant movements of the gimbal ring 23 along the teetering axis 19 although the gimbal ring is free to pivot about such axis.

Mounted for pivotal movements about a flapping axis 26 generally normal to the teetering axis 19 is a substantially annular hub structure 27 circumjacent the rotor shaft 17. The hub structure 27 is generally located below the gimbal ring 23 but is equipped with two pairs (28 and 28') of bifurcated brackets respectively comprising upwardly extending ears 29–30 and 29'–30', each pair of which straddles the gimbal ring 23. Extending through openings provided therefor in the spaced ears 29 and 30 is a bolt structure 31 that also extends through a bore provided therefor in the gimbal ring. In a similar manner, a bolt structure 31' extends through openings provided therefor in the spaced ears 29'–30' and also through a bore aligned therewith in the gimbal ring. The bolt structures 31 and 31' define the flapping axis 26, and are pivotally received within the bores therefor in the gimbal ring 23 and are preferably mounted therein on roller bearings or other suitable anti-friction devices.

As a consequence of this mounting arrangement, the hub structure 27 is pivotal about the flapping axis 26 and is also pivotal about the teetering axis 19; and therefore, the hub structure is effectively supported for generally universal pivotal movements relative to the rotor shaft 17, but at the same time can be rotatably driven by such shaft. Necessarily then, both the main rotor blade structures 15 and 15' and the control blade structures 16 and 16' are pivotal relative to the teetering axis 19 and flapping axis 26 since all such blade structures are carried by the hub 27.

In this latter respect, and as indicated in FIGURE 1, the control blade structure 16 comprises a sleeve or socket 32 supported for limited rotational displacements about a stub shaft or trunnion 33 formed integrally with a base plate 34 bolted or otherwise rigidly secured to the hub structure 27. The sleeve 32 provides a mounting for a control blade (not shown), and such control blade is rotatable about the span-wise axis thereof. In an identical manner, the control blade structure 16' includes a sleeve or socket 32' supported for limited rotational displacements about a stub shaft or trunnion formed integrally with a base plate bolted or otherwise rigidly secured to the hub structure 27. The sleeve 32' provides a mounting for a control blade (not shown), and such control blade is rotatable about its span-wise axis.

The control blade structures 16 and 16' as described in detail in the aforementioned Patent No. 2,534,353, are used to introduce pitch control into the rotor blade assembly, and to accomplish this result, effect tilting of the hub structure 27 in the desired azimuth in response to cyclic feathering or pitch changes enforced thereon. Such cyclic pitch changes are enforced on the control blade structures through incidence arm assemblies 35 and 35" pivotally secured to the rotatable sleeves 32 and 32' and operatively connected to a suitable swashplate or wobble plate mechanism, as disclosed in such prior patent, the angular disposition of which is manually controlled from the pilot's station. Tilting of the hub structure 27 causes the tip path plane described by the rotational movement of the main rotor blade structures 15 and 15' to be tilted in the proper azimuth because such structures are supported and carried by the hub structure 27. More particularly, the main rotor blade structures 15 and 15' respectively comprise hollow sleeves or sockets 36 and 36' formed integrally with or otherwise rigidly related to the hub structure 27. Such sleeves support therein on suitable anti-friction bearings the main rotor blades (not shown), and quite evidently then, such main rotor blades must tilt with the hub structure 27.

As stated heretofore, the main rotor blades are respectively supported relative to the sleeves 36 and 36' for limited angular displacements about their span-wise axes 18 and 18' for the purpose of selectively changing and adjusting the collective pitch thereof. The collective pitch of the main rotor blades is adjustably altered through an assembly that includes a rod 37 coaxially mounted within the hollow rotor shaft 17 and supported with respect thereto for reciprocable movement along the axis thereof. The rod 37 extends upwardly beyond the terminus of the rotor shaft 17, and is stabilized adjacent its upper end by a support collar 38 that slidably passes the rod therethrough and is bolted or otherwise secured to the gimbal ring 23.

Affixed to the rod 37 at its upper end is a connector 39 that is pivotally secured adjacent one end to a collective pitch incidence arm 40 and adjacent its other end to a corresponding incidence arm 40'. The rod 37 is connected through appropriate linkage to the collective pitch control stick at the pilot's station, and the collective pitch of the main rotor blades is changed by moving the rod 37 either upwardly or downwardly which results in the main rotor blades being pivoted about their span-wise axes 18 and 18' since the arms 40 and 40' are connected thereto so as to accomplish such purpose.

Respectively extending upwardly from the trunnions 22 and 22' intermediate the gimbal ring 23 and sleeve 20 are a pair of torque arms 41 and 41' that may be clamped thereon (as shown at 42) to prevent displacements therealong and keyed to the trunnions (as shown at 43) to prevent relative rotation therebetween. The torque arm 41 extends upwardly through a slot 44 in a hollow sleeve or cylinder 45. The slot 44 is located in the lower surface portion of the cylinder 45 and is elongated along the length thereof. Supported within the cylinder 45 for reciprocable movements therealong is a piston or plunger 46 provided centrally with an opening or recess 47 which receives therein the upper end or head of the torque arm 41 which is slightly relieved so as to facilitate limited angular movements of the piston relative to the torque arm.

The opposite end portions 48 and 49 of the piston 46 are slightly reduced in diameter, and respectively circumjacent the same are resilient spring structures 50 and 51. The spring structures are each constrained against longitudinal displacements relative to the cylinder 45; and they respectively seat at their inner ends against reaction washers 52 and 53 that respectively bear against inwardly extending annular shoulders 54 and 55 provided by the cylinder, and at their outer ends the spring structures respectively bear against reaction washers 56 and 57 that are respectively confined within the cylinder by caps 58 and 59 threadedly secured to the cylinder.

As shown most clearly in FIGURE 4, in the neutral or centered position of the piston 46 each of the inner reaction washers 52 and 53 bears against an associated shoulder 60, each of which is defined by the adjacent mergence of the intermediate portion of the piston having the relatively large diameter and the smaller-diameter end portions thereof. Additionally, the outer reaction washers 56 in the neutral position of the piston respectively seat against stops or washers 61 secured to, and of slightly greater diameter than, the corresponding end portions of the piston by cap screws 62. All of the reaction washers are slidably circumjacent the piston end portions.

It will be evident that the piston 46 may be displaced in either axial direction along the cylinder 45; and displacement thereof toward the left as viewed in FIGURE 4 causes the cap screw 62, stop element 61 and reduced end portion 58 of the piston to be moved outwardly through an intermediate central opening 63 in the cap 58 (the cap 59 having a similar central opening therein). The outer reaction washer 56, however, is constrained against movement in such direction by its abutment with the cap 58, but the inner reaction washer 52 is displaced toward the left because of its abutment with the shoulder 60 of the piston. Consequently, the spring assembly 50 is compressed and the resilient restoring force thereby developed between the cylinder cap 58 and piston 46 tends to return the latter to its neutral position and progressively increases in magnitude in relation to the displacement of the piston generally in accordance with Hooke's law.

At the same time, such displacement of the piston 46 toward the left causes the spring structure 51 to be similarly compressed because movement thereof toward the interior of the cylinder is prevented by abutment of the spring with the reaction washer 53 which is unable to move because of its abutment with the annular shoulder 55. The spring structure 51 must be compressed, however, because of its abutment with the outer stop (corresponding to the stop 61 and cap screw 62) which in being carried by the piston is displaced therewith. Thus, the compressive force in the spring structure 51 progressively increases in magnitude in relation to the displacement of the piston generally in accordance with Hooke's law. Quite evidently, relative displacement between the piston 46 and cylinder 45 in the opposite direction brings about a corresponding compression of the spring structures 50 and 51 which also tends to restore the piston and cylinder to the neutral position thereof shown in full lines in FIGURE 2.

The ordinary relative displacements of the piston and cylinder are usually brought about by movements of the cylinder 45 with respect to the piston, rather than by movements of the piston with respect to the cylinder. More particularly, if the tip path plane of the main rotors is substantially horizontal (in which event, it is generally normal to the upwardly extending axis of the rotor shaft 17), the piston and cylinder have the centered neutral position thereof shown by full lines in FIGURE 2, and such relative orientation of the rotor hub assembly and rotor shaft tends to be maintained by the centering action of the spring structures 50 and 51. If, however, the hub structure 27 is rotated in a clockwise direction, as viewed in FIGURE 2, about the teetering axis 19 (which extends through and is defined by the trunnions 22 and 22'), the main rotor blade structures 15 and 15' will rotate about such teetering axis into the alternate position indicated in this figure.

As a result, the gimbal ring 23 is rotated in a clockwise direction about the teetering axis, as is the cylinder 45 because it is rigidly related to the gimbal ring. In this latter respect, and as shown most clearly in FIGURE 2, the caps 58 and 59 define bracket structures, the first of which is fastened to the gimbal ring by a pair of cap screws 64 and the second by a pair of cap screws 65; and the gimbal ring 23, if it has an annular groove along the upper surface thereof to reduce weight, may be equipped with filler blocks 66 and 67 respectively underlying the bracket caps 58 and 59 to provide a firm support therefor.

The torque arm 41 does not rotate, however, because it is rigidly constrained by the trunnion 22 which, in turn, is carried by the rotor shaft 17 through the collar 30. Therefore, although the torque arm 41 remains in its centered position, the cylinder 45 must be displaced toward the right because it is rotating about the teetering axis 19 which is spaced from the effective center of the head or upper end portion of the torque arm. Such a rotated position of the cylinder is indicated by broken lines in FIGURE 2. The piston 46 cannot be so displaced toward the right because it is in rigid abutment with the torque arm 41; and, therefore, the piston 46 simply rotates about the effective center of the upper end portion of the torque arm, but is not bodily displaced with respect thereto. Consequently, the resulting relative movement between the piston 46 and cylinder 45 causes the piston to move outwardly from the cylinder, as shown by broken lines in FIGURE 4 and as heretofore described; and the corresponding compression of the spring structures 50 and 51 develops a restoring force between the piston and cylinder tending to restore the same to their neutral position.

This restoring force appears as a torque developed about the teetering axis 19 and operative between the rotor hub assembly and the rotor shaft 17; and irrespective of the arcuate distance through which the rotor hub assembly is pivoted about the teetering axis, and irrespective of the direction of such pivotal movement about such axis, the developed torque always and automatically operates between the rotor hub assembly and the rotor shaft 17 in a direction tending to restore the same to their neutral position, as shown in FIGURE 2, in which the tip path plane described by the rotor blade structures 15 and 15' is generally normal to the upwardly extending axis of the rotor shaft.

Considering a helicopter in flight, it may be noted that the relative orientation of the rotor shaft 17 and of the rotor hub assembly is substantially the same irrespective of whether the aircraft has no translational movement and is hovering or whether it is traveling with respect to the ground (assuming that the aircraft is in a stable condition; disregarding any cyclic control that must be fed into the rotor hub assembly to maintain such stability—that is, balance the aircraft by aligning the rotor thrust with the contemporary location of the flight center of gravity of the aircraft; and following by a sufficient time interval any change in the cyclic control of the aircraft to impart translational movement thereto in some desired azimuth).

Accordingly, to effect translational movement of the aircraft or to effect a change in the direction of such movement, the rotor hub assembly is tilted (through appropriate manipulation of the control blade structures 16 and 16' in the rotor blade assembly of FIGURES 1 and 2) in an appropriate direction to cause the tip path plane of the rotor blades to tilt in the desired direction of movement. At this time, then, the rotor hub assembly is angularly disposed with respect to the rotor shaft 17 as, for example, in the direction indicated by the alternate position of the rotor hub assembly shown in FIGURE 2. As the aircraft begins to move in the desired direction, the pilot commences to return the cyclic control stick to its prior neutral position, whereupon the rotor shaft 17 tends to resume an orientation generally normal to the tip path plane of the rotor blades and the fuselage is then pulled along by the rotor.

However, the introduction of a change in the cyclic control creates a condition of instability in the aircraft in which the body thereof has a rolling or pitching torque applied thereto because the thrust of the rotor blades is momentarily offset from the flight center of gravity of the aircraft. A summation of moments about the rotor establishes that the tendency created by such instability is for the aircraft body to rotate in a generally vertical plane along an arc traveling upwardly across the path of the translational movement being enforced upon the aircraft as a result of the change in the cyclic control thereof. The resultant instability will not cause the aircraft to be uncontrollable so long as the rotor thrust vector remains sufficiently close to the contemporary flight center of gravity that the design limitations of the aircraft are not exceeded; and to insure the existence of this condition, the flight center of gravity must not be permitted to pass beyond the permissible range of travel therefor.

In the present structure, the aforementioned torque developed about the teetering axis and operative between the rotor hub assembly and the rotor shaft 17 is a corrective torque because it is active in a direction that opposes the rolling or pitching torque of the aircraft body caused by a change in cyclic control and applies its corrective action to such body through the rotor shaft 17. The magnitude of this corrective opposing torque corresponds automatically to the magnitude of the rolling or pitching torque in the sense that the values thereof are concurrently lesser or greater in accordance with the amount of change in the cyclic control being introduced and the consequent amount of tilt of the rotor plane. The result of this corrective action is to enable the permissible range of travel of the flight center of gravity to be increased or extended because the uncontrollable instability which might otherwise be introduced into the aircraft as a consequence of the flight center of gravity thereof having traveled beyond the limits of such permissible range is counteracted and opposed by the corrective opposing torque.

In the embodiment illustrated in FIGURES 1 and 2, it will be noted that the cylinder 45, piston 46, spring structures 50 and 51, and the other associated components are located along one side of the rotor shaft 17, and further noted that such structural essemblage is duplicated on the opposite side of the rotor shaft in operative arrangement with the torque arm 41'. Such duplicate assemblage functions in parallel with the particularly described assemblage. Also, in the specific design shown, the structures 50 and 51 are Belleville spring assemblies. In a particular helicopter exemplification of the invention, the corrective torque action has been found to add about 37% to the control available from the rotor thrust vector tilt, which adds about seven inches to the otherwise maximum range of travel of the aircraft flight center of gravity in the fore and aft directions. Also, in this specific exemplification it has been found that a wind gust in the order of 45 m.p.h. is required to bottom the rotor blade assembly in the non-rotative condition thereof against the stops therefor.

A modified embodiment of the invention is illustrated in FIGURES 5 through 8, and with respect to the rotor hub assembly and lift wing assembly generally the structural arrangement is the same as that shown in FIGURES 1 and 2 and heretofore described in detail. Therefore, the structure will not again be particularized except for the arrangement that applies the corrective torque to the rotor shaft or column, which differs from that of the embodiment illustrated in FIGURES 1 through 4. As concerns the other components of the rotary wing assembly, the same numerals will be employed to identify corresponding parts that were used in FIGURES 1 and 2 except that the order thereof will be increased to 100 for purposes of differentiation.

Figure 7:
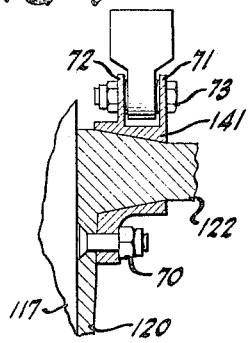
FIGURE 7 is a broken vertical sectional view taken along the line 7—7 of FIGURE 6.
Figure 6:
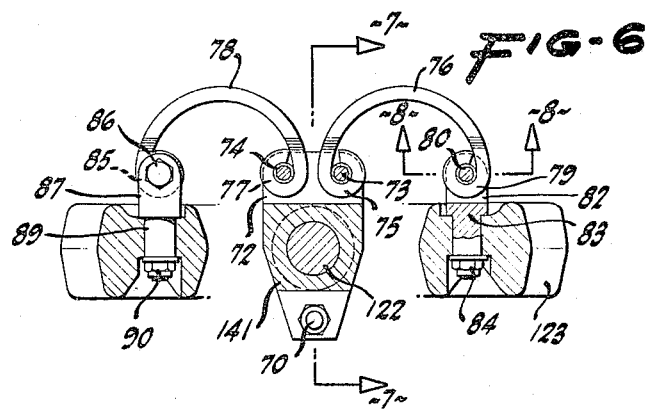
FIGURE 6 is essentially a longitudinal sectional view taken along the line 6—6 of FIGURE 5.
Figure 8:
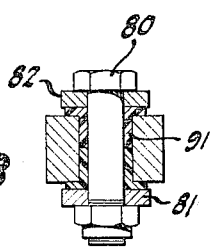
FIGURE 8 is an enlarged, longitudinal sectional view taken along the line 8—8 of FIGURE 6.

As shown most clearly in FIGURE 7, a torque arm 141 is secured to the trunnion 122 intermediate the collar 120 (which is drivingly connected to the rotor shaft 117) and the gimbal ring 123, and the torque arm is secured in such position by fastener structure such as the nut and bolt arrangement 70 that fixedly clamps the torque arm in the position illustrated and thereby constrains the same against pivotal movements about the trunnion 122 and also against bodily displacements therealong. Adjacent its upper end, the torque arm is bifurcated to provide spaced ears 71 and 72, and extending therebetween in spaced apart relation are a pair of pivot pins 73 and 74. The pivot pin 73 extends through an end portion 75 of a generally C-shaped spring 76, such end portion thereof being looped to form an eye through which the pin extends. The pin 74 similarly extends through the looped end portion 77 of a C-shaped spring 78 which is substantially identical to the spring 76.

At its opposite end the spring 76 is looped to form an eye 79, and extending therethrough is a pin 80 carried by and secured to the spaced ears 81 and 82 of a fastener 83 which projects downwardly through an opening provided therefor in the gimbal ring 123, and which is threaded at its lower end so as to receive a nut 84 which fixedly anchors the fastener to the gimbal ring. In an identical manner, the spring 78 is looped to form an eye 85, and extending therethrough is a pin 86 carried by and secured to the spaced ears 87 and 88 of a fastener 89 which projects downwardly through an opening provided therefor in the gimbal ring 123, and which is threaded at its lower end so as to receive a nut 90 which fixedly anchors the fastener to the gimbal ring.

The end portions of the springs 76 and 78 are pivotally related to the respectively associated pins extending therethrough; and to minimize frictional resistance to pivotal displacements, bushing structures (such as the bushing arrangement 91 illustrated in FIGURE 8 in association with the pin 80) are arranged with each of the pins 73, 74, 80 and 86; and by way of example, each such bushing structure may be formed from Teflon or some other material having a relatively low frictional coefficient.

Figure 5:
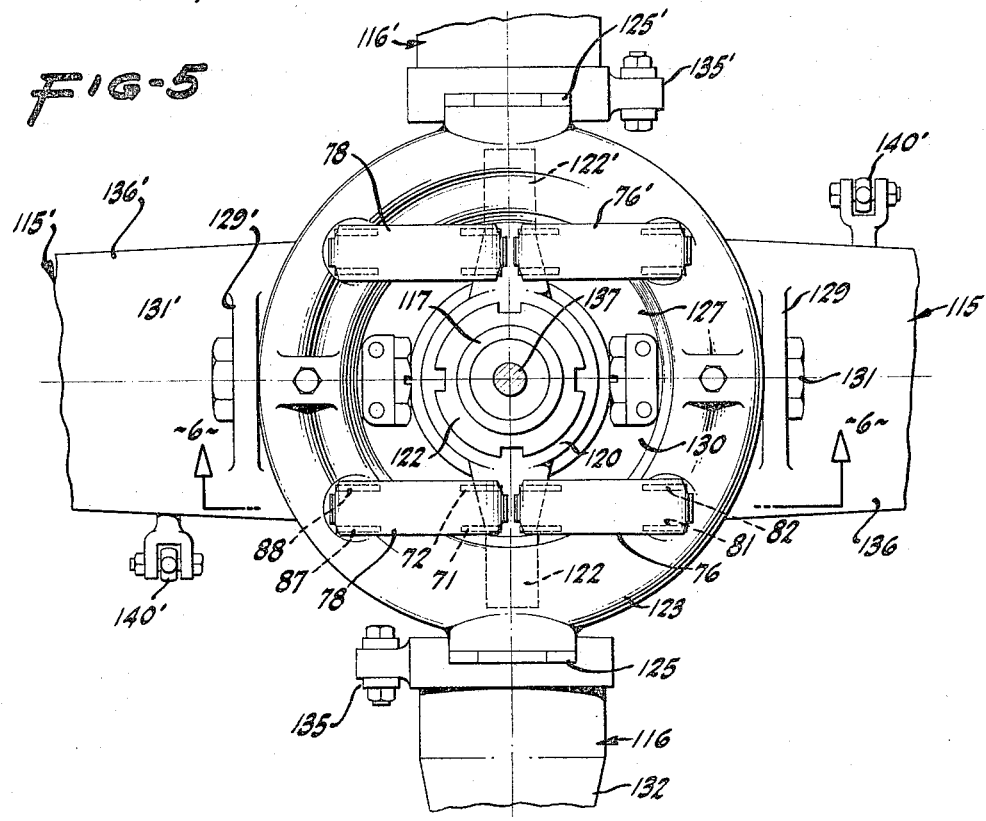
FIGURE 5 is essentially a broken top plan view of a modified rotor hub assembly embodying the invention, certain of the collective pitch control elements being omitted for clarity.

By referring to FIGURE 5, it will be seen that the described spring composition is duplicated along the opposite side of the rotor shaft and, where appropriate, the primed form of the same numerals have been employed to identify respectively corresponding elements. These two diametrically opposite spring assemblies function in parallel to apply a corrective torque between the rotor hub assembly and rotor shaft in response to tilting of the rotor hub and tip path plane of the rotary wing assembly.

As concerns the corrective torque developed about the teetering axis and operative between the rotor hub assembly and rotor shaft, the springs 76 and 78 and their counterparts 76' and 78' are stressed (extended) by any angular displacement of the rotor hub assembly about the teetering axis and therefore tend to restore the rotor shaft 117 to its prior position of general normalcy relative to the rotor hub assembly. Consequently, the corrective action is the same in all essential respects as that developed by the spring structures 50 and 51 illustrated and described in the embodiment of FIGURES 1 through 4 and, accordingly, this function need not be again described.

A further modified rotary wing aircraft is illustrated in FIGURES 9 through 11, and it differs in character from the rotary wing assemblies illustrated in the prior embodiments in the sense that cyclic control is obtained by cyclically feathering each of the rotor blade structures in an appropriate pattern as the lift wing assembly is rotated, rather than by directly tilting the rotor hub assembly as in the prior embodiments. Except for those changes made to exemplify the present invention, the rotor blade assembly both structurally and functionally may be the same as the assembly disclosed and described in detail in the copending application of Wesley T. Gandy, Ser. No. 242,509, filed Dec. 5, 1962.

Accordingly, the rotary wing assembly includes a rotor column or mast 92 adapted to be rotatably driven by a suitable power train, not shown. Adjacent its upper end portion, the rotor column 92 is equipped with a pair of outwardly extending diametrically disposed trunnions which are generally normal to the longitudinal axis of the upwardly extending rotor column. Supported for pivotal displacements upon such trunnions is a hangar structure 93; and as explained in the aforementioned Gandy application, Ser. No. 242,509, the hangar structure 93 is journaled on appropriate bearings which are incapsulated in a body of liquid lubricant, the level of which can be visually observed through a transparent sight gauge 94.

The hangar 93 constitutes a part of the rotor hub assembly which further includes a blade carrier 95 fixedly secured at its upper end to the hangar 93, as by means of the bolt-type fasteners 96 shown. The blade carrier 95 is provided with a pair of support shafts (not shown) which extend laterally outwardly from the rotor column 92 and define the spanwise axes of the lift wing structure or main rotor blades, the root end portions of which are shown in FIGURES 9 and 10 and are respectively designated with the numerals of 97 and 97'. For purposes of identification, the spanwise axes of the two rotor blades 97 and 97' are respectively designated with the numerals 98 and 98', the longitudinal axis of the rotor column 92 is designated with the numeral 99, the teetering axis about which the hangar 93 is angularly displaceable is denoted with the numeral 100.

The main rotor blades are angularly movable relative to their respective spanwise axes 98 and 98' which axes, therefore, define the pitch control axes of the rotary wing assembly. Consequently, the main rotor blades, and particularly their root ends, are supported for pivotal movements above the axes 98 and 98'. In order to enforce selected angular adjustments on the main rotor blades, such blades, as shown in FIG. 10, are equipped with control arms 101 and 101' (such arms being omitted in FIG. 9 for purposes of simplifying the illustration) having bifurcated outer ends adapted to be pivotally connected with push rod structures through which both cyclic and collective pitch adjustments are enforced on the two rotor blades. Such push rod structures are not shown since they may be conventional; and in the usual case they are operatively connected to a swash plate assembly, the angular disposition of which is determined by the pilot of the aircraft.

Accordingly, as the main rotor blades are revolved about the longitudinal axis 99 of the rotor column, such rotor blades are cyclically feathered in an appropriate pattern causing the tip path plane described thereby to be tilted to enable the aircraft to move horizontally. Such tilting of the tip path plane is indicated in FIG. 9 by the alternate position of the spanwise axis 98 and 98'. As is evident in this figure, the main rotor blades have been angularly displaced in a counter clockwise direction about the teetering axis 100, and the extent of such counter-clockwise displacement is represented by the angle $\theta$.

As shown most clearly in FIG. 9, that portion of the rotor column 92 located below the carrier 95 is equipped with a clamping block 102 which may be formed of two symmetrical components disposed circumjacent the rotor column 92 and tightly clamped thereagainst by bolt type fasteners 103. Associated with the clamping block 102 are a plurality of spring structures effectively operative between the rotor column 92 and the rotor hub assembly (comprising the hangar 93 and blade carrier 95) to bias the same toward a predetermined relative orientation. In the particular structure shown in FIGS. 9 and 10, there are four such springs arranged in cooperative pairs and for purposes of identification, such springs are denoted with the numerals 104, 105 and 104', 105'. Such springs are substantially identical—one thereof being illustrated in detail in FIG. 11 with the identifying numeral 104 being selected for application thereto.

Each of the springs has a generally V-shaped configuration with the legs of such V converging downwardly toward their integral mergence at the base of the configuration. Each spring also is a leaf spring and may be integral from end to end thereof as shown. One or more contiguous leaves may be used to form the spring (half leaves might be employed in certain instances), and in the particular structure shown, each of the springs comprises two indivdual leaves. Each leg of the V-shaped spring adjacent its outer narrow end is rolled upon itself to form a tubular collar adapted to receive a pivot pin therein. For purposes of positive identification, the two individual leaves of spring 104 are respectively designated with the numerals 104a and 104b, the two diverging legs of the spring are indicated by the numerals 106 and 107, and the tubular collars provided at the ends of such legs are identified with the numerals 106a and 107a.

As is most evident in FIG. 9, the inner adjacent legs of the paired springs 104 and 105 are respectively connected to the clamping block 102 by cap screws 108 and 109 which extend through the tubular collars provided by such inner legs at the upper ends thereof. In the usual instance, a spacer coaxially receiving the associated pivot pin or cap screw therein is therefore interposed between such pin and the coaxially circumjacent collar to provide a bearing therefor. The outer leg of the spring 104 is similarly connected by a bolt 110 to a bracket 111 fixedly secured to the carrier 95 by bolts 112 or similar fasteners. A pair of such brackets are provided, one adjacent each of the lift wings 97 and 97′, and each of the brackets is transversely elongated so as to enable connection thereto of the springs 104 and 104′ in the case of the bracket 111 and connection thereto of the spring 105 and 105′ in the case of the bracket 111′. Spacers may be used in association with each of the bolts connecting the springs to the brackets 111 and 111′.

Quite evidently, the tubular collars of the spring members are pivotal with respect to the pins respectively extending therethrough, and slight relative displacements occur therebetween upon any pivotal movement of the rotor hub assembly about the teetering axis 100. Thus, as shown in FIG. 9, when the rotor hub assembly is pivoted in a counter clockwise direction, the spring 104 is stressed because the legs thereof are spread apart to a greater extent by such pivotal movement; and in an opposite but complementary manner, the spring 105 is stressed because the legs thereof are compressed or closed by such movement of the rotor hub assembly. As a result, each of the springs in being stressed tends to restore the rotor hub assembly to its prior position in which the tip path plane described by the rotor blades is generally normal to the longitudinal axis 99 of the rotor column. Therefore, the springs 104 and 105 are aggregative in their tendency to return the rotor hub assembly to its predisplaced position.

The springs 104′ and 105′ function in precisely the same manner, and again considering the counter clockwise displacement shown in FIG. 9, the consequent expansion of the spring 104′ and compression of the spring 105′ tend to return the rotor hub assembly to its normal generally horizontal position. It is apparent that any angular displacement of the rotor hub assembly in an opposite direction about the teetering axis 100 (that is, in a clockwise direction) will similarly stress each of the springs with the two springs 104 and 104′ being compressed (the legs thereof closing) and the two springs 105 and 105′ being extended (the legs thereof opening). It may be stated, then, that any angular displacement of the rotor hub assembly about the teetering axis 100 causes each of the springs to be stressed with the result that the restoring forces inherent in any such stressing of the springs are aggregative in their tendency to return the rotor hub assembly to its predisplaced or generally horizontal position relative to the rotor column.

In each embodiment of the invention illustrated and described, a resilient spring force is operative between the rotor hub assembly and rotor column tending to bias the same toward a predetermined orientation in which the tip path plane described by the rotor blades during rotation thereof is generally normal to the longitudinal axis of the rotor column or shaft. The corrective force operatively applied between the rotor column and rotor hub assembly automatically attains a magnitude proportionate to the extent of the angular displacement of the rotor hub assembly. As a result a corrective force of appropriate magnitude and direction is applied between the rotor column and rotor hub assembly tending to return the same to such predetermined orientation or upon any displacement therefrom. This result is obtained irrespective of whether cyclic control is obtained by directly tilting the rotor hub assembly, as in the embodiment of the illustration illustrated in FIGS. 1 through 4 and 5 through 8, or by cyclically feathering each rotor blade, as in the embodiment illustrated in FIGS. 9 through 11. In each instance it is a summation of the individual spring forces respectively provided by the plurality of springs which tends to bias the rotor column and rotor hub assembly toward a predetermined orientation. The end result of this arrangement is an extension of the permissible range of movement of the flight center of gravity of a rotary wing aircraft equipped with such resilient biasing means.

While in the foregoing specification embodiments of the invention have been described in considerable detail for purposes of making a complete disclosure thereof, it will be apparent to those skilled in the art that numerous changes may be made in such details without departing from the spirit and principles of the invention.

What is claimed is:

1. In combination with the upwardly extending rotor shaft of a rotary wing aircraft, a lift wing assembly including a rotor hub and a plurality of rotor blades extending outwardly therefrom in different directions, mounting structure connecting said hub with said rotor shaft so as to be rotatably driven thereby and supporting the hub for angular displacements relative to said rotor shaft about a transverse axis generally normal to a plane including the axis of rotation of the rotor shaft to enable the tip path plane described by rotation of said lift wing assembly to be tilted to change the orientation of the thrust developed thereby so as to effect cyclic control of such aircraft, and a plurality of spring structures each offset transversely from the axis of rotation of said rotor shaft and being respectively connected between said hub and rotor shaft in a generally right-angle disposition with respect to such transverse axis so as to develop a corrective force between said hub and rotor shaft tending to restore the same to a predetermined orientation following any relative angular displacement therebetween about such transverse axis, whereby the permissible range of travel of the flight center of gravity of such aircraft is extended by such corrective force application, said spring structures comprising an even number thereof and being symmetrically disposed about the axis of rotation of said rotor shaft at substantially equal angular distances from each other.

2. The combination of claim 1 in which each of said spring structures is a helical spring.

3. The combination of claim 1 in which each of said spring structures is a generally C-shaped spring.

4. The combination of claim 1 in which each of said springs is a leaf spring having a generally V-shaped configuration.

5. In combination with the upwardly extending rotor shaft of a rotary wing aircraft, a lift wing assembly including a rotor hub, mounting structure connecting said hub with said rotor shaft so as to be rotatably driven thereby and supporting the hub for angular displacements relative to said rotor shaft to enable the tip path plane described by rotation of said lift wing assembly to be tilted to change the orientation of the thrust developed thereby so as to effect cyclic control of such aircraft, and a plurality of spring structures respectively connected between said hub and rotor shaft to develop a corrective force therebetween tending to restore the same to a predetermined orientation following any relative angular displacement therebetween, whereby the permissible range of travel of the flight center of gravity of such aircraft is extended by such corrective force application, said spring structures being arranged in pairs and each spring structure comprising a helical spring, a casing for each pair of springs defining a cylinder receiving the same therein and being connected with said hub so as to be angularly displaced therewith, a piston for each casing and being reciprocable within the cylinder thereof and defining a seat for such pair of associated springs adjacent one of the ends thereof, and torque arm structure fixedly related to said rotor shaft and being drivingly connected with said piston, whereby angular displacements of said hub relative to said rotor shaft cause said cylinder to be displaced with respect to said piston with the result that such pair of springs is stressed and develops a corrective force between said hub and rotor shaft tending to restore the same to the aforesaid predetermined orientation.

6. In combination with the upwardly extending rotor shaft of a rotary wing aircraft, a lift wing assembly including a rotor hub, mounting structure connecting said hub with said rotor shaft so as to be rotatably driven thereby and supporting the hub for angular displacements relative to said rotor shaft to enable the tip path plane described by rotation of said lift wing assembly to be tilted to change the orientation of the thrust developed thereby so as to effect cyclic control of such aircraft, and a spring structure connected between said hub and rotor shaft to develop a corrective force therebetween tending to restore the same to a predetermined orientation following any relative angular displacement therebetween, whereby the permissible range of travel of the flight center of gravity of such aircraft is extended by such corrective force application, said spring structure comprising a helical spring and a casing defining a cylinder receiving said spring therein and being connected with said hub so as to be angularly displaced therewith, a piston reciprocable within said cylinder and being connected with said spring so as to stress the same upon relative displacement of said piston and cylinder, and torque arm structure fixedly related to said rotor shaft and being drivingly connected with said piston, whereby angular displacements of said hub relative to said rotor shaft cause said cylinder to be displaced with respect to said piston with the result that said spring is stressed and develops a corrective force between said hub and rotor shaft tending to restore the same to the aforesaid predetermined orientation.

References Cited by the Examiner

UNITED STATES PATENTS

| | | | |
|---|---|---|---|
| 1,742,665 | 1/1930 | Oehmichen | 170—160.56 X |
| 1,859,584 | 5/1932 | Cierva | 170—160.56 X |
| 2,534,353 | 12/1950 | Hiller et al. | 170—160.26 |
| 2,595,642 | 5/1952 | Daland | 170—160.25 |
| 2,672,202 | 3/1954 | Pullin et al. | 170—160.55 |
| 2,961,051 | 11/1960 | Wilford et al. | 170—160.54 X |
| 3,144,906 | 8/1964 | Shaw | 170—160.13 |

FOREIGN PATENTS 931,198  9/1947  France.

MARTIN P. SCHWADRON, *Primary Examiner.*

SAMUEL LEVINE, EDGAR W. GEOGHEGAN,
*Examiners.*

E. A. POWELL, JR., *Assistant Examiner.*